(12) United States Patent
Giri et al.

(10) Patent No.: US 12,206,601 B2
(45) Date of Patent: Jan. 21, 2025

(54) BACKPRESSURE NOTIFICATIONS TO PEERS FOR BGP UPDATES

(71) Applicant: Ciena Corporation, Hanover, MD (US)

(72) Inventors: Mahesh Giri, Ghaziabad (IN); Atul Mehra, Gurgaon (IN); Anurag Prakash, Kanata (CA); Yong Yin, Ottawa (CA); Ritesh Singal, Gurgaon (IN); Peter Pieda, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 18/326,726

(22) Filed: May 31, 2023

(65) Prior Publication Data

US 2024/0348564 A1 Oct. 17, 2024

(30) Foreign Application Priority Data

Apr. 13, 2023 (IN) ............................. 202311027415

(51) Int. Cl.
*H04L 49/506* (2022.01)
*H04L 43/08* (2022.01)
*H04L 45/033* (2022.01)
*H04L 45/12* (2022.01)
*H04L 45/44* (2022.01)

(52) U.S. Cl.
CPC ............ *H04L 49/506* (2013.01); *H04L 43/08* (2013.01); *H04L 45/033* (2022.05); *H04L 45/123* (2013.01); *H04L 45/44* (2013.01)

(58) Field of Classification Search
CPC ..... H04L 49/506; H04L 43/08; H04L 45/033; H04L 45/123; H04L 45/44
See application file for complete search history.

(56) References Cited

U.S. PATENT DOCUMENTS

| 6,480,899 B1 | 11/2002 | Seddigh et al. |
| 6,646,988 B1 | 11/2003 | Nandy et al. |
| 6,882,627 B2 | 4/2005 | Pieda et al. |

(Continued)

FOREIGN PATENT DOCUMENTS

| CA | 2358174 A1 | 4/2003 |
| CA | 2350449 C | 1/2006 |

(Continued)

OTHER PUBLICATIONS

Y. Rekhter et al., "A Border Gateway Protocol 4 (BGP-4)," Network Working Group, RFC 4271, Category Standards Track, The Internet Society, Jan. 2006, 103 Pages.

(Continued)

*Primary Examiner* — Abdulkader M Alriyashi
(74) *Attorney, Agent, or Firm* — Baratta Law PLLC; Lawrence A. Baratta, Jr.

(57) ABSTRACT

A router configured to implement Border Gateway Protocol (BGP) includes circuitry configured to receive BGP updates from one or more BGP peers connected to the router, detect a trigger related to BGP updates where the trigger is indicative of a need to apply backpressure by the one or more BGP peers, and send a backpressure notification message to the one or more BGP peers based on the trigger, such that the one or more BGP peers apply the backpressure. The circuitry can be further configured to monitor one or more criteria associated with operation of the router, for the trigger.

18 Claims, 3 Drawing Sheets

(56) References Cited

U.S. PATENT DOCUMENTS

| | | | |
|---|---|---|---|
| 7,492,714 B1 * | 2/2009 | Liao | H04L 45/742 |
| | | | 370/235 |
| 7,978,607 B1 * | 7/2011 | Halabi | H04L 47/263 |
| | | | 370/230.1 |
| 8,666,247 B2 | 3/2014 | Srinivasan et al. | |
| 8,682,160 B2 | 3/2014 | Prakash et al. | |
| 8,718,471 B2 | 5/2014 | Prakash et al. | |
| 8,737,235 B2 | 5/2014 | Nandy et al. | |
| 8,818,198 B2 | 8/2014 | Trnkus et al. | |
| 8,854,955 B2 | 10/2014 | Prakash et al. | |
| 9,054,831 B2 | 6/2015 | Prakash et al. | |
| 9,118,421 B2 | 8/2015 | Swinkels et al. | |
| 9,172,658 B2 | 10/2015 | Kakkar et al. | |
| 9,407,359 B2 | 8/2016 | Swinkels et al. | |
| 9,485,550 B2 | 11/2016 | Chhillar et al. | |
| 9,485,551 B2 | 11/2016 | Prakash et al. | |
| 9,800,522 B2 | 10/2017 | Chhillar et al. | |
| 9,985,724 B2 | 5/2018 | Prakash et al. | |
| 9,992,102 B2 | 6/2018 | Chhabra et al. | |
| 10,003,867 B2 | 6/2018 | Prakash et al. | |
| 10,038,495 B2 | 7/2018 | Prakash et al. | |
| 10,097,306 B1 | 10/2018 | Chhillar et al. | |
| 10,158,448 B2 | 12/2018 | Prakash et al. | |
| 10,187,144 B2 | 1/2019 | Prakash et al. | |
| 10,411,806 B2 | 9/2019 | Prakash et al. | |
| 10,455,300 B2 | 10/2019 | Swinkels et al. | |
| 10,536,216 B1 | 1/2020 | Chhillar et al. | |
| 10,862,797 B2 | 12/2020 | Gautam et al. | |
| 10,972,359 B2 | 4/2021 | Miedema et al. | |
| 11,055,155 B2 | 7/2021 | Prakash et al. | |
| 11,444,828 B2 | 9/2022 | Prakash et al. | |
| 2002/0009081 A1 | 1/2002 | Sampath et al. | |
| 2003/0063613 A1 | 4/2003 | Carpini et al. | |
| 2003/0193898 A1 | 10/2003 | Wong et al. | |
| 2004/0234197 A1 | 11/2004 | Ng et al. | |
| 2005/0177634 A1 * | 8/2005 | Scudder | H04L 45/22 |
| | | | 709/225 |
| 2008/0089348 A1 * | 4/2008 | Appanna | H04L 45/02 |
| | | | 370/503 |
| 2015/0117850 A1 | 4/2015 | Prakash et al. | |
| 2016/0227303 A1 | 8/2016 | Prakash et al. | |
| 2017/0163489 A1 | 6/2017 | Prakash et al. | |
| 2021/0042172 A1 | 2/2021 | Miedema et al. | |
| 2021/0250228 A1 | 8/2021 | Parkash et al. | |
| 2022/0224629 A1 | 7/2022 | Mada et al. | |

FOREIGN PATENT DOCUMENTS

| | | |
|---|---|---|
| EP | 3 051 725 A1 | 8/2016 |
| EP | 2963852 B1 | 8/2019 |
| EP | 2 983 314 B1 | 1/2023 |
| IN | 2014DE00528 A | 8/2014 |
| WO | 02103965 A1 | 12/2002 |
| WO | 2021030170 A1 | 2/2021 |

OTHER PUBLICATIONS

Jul. 17, 2024, European Search Report for European Patent Application No. EP 24 16 1502.

* cited by examiner

BACKPRESSURE NOTIFICATIONS TO PEERS FOR BGP UPDATES

FIELD OF THE DISCLOSURE

The present disclosure relates generally to networking and computing. More particularly, the present disclosure relates to systems and methods for backpressure notifications to peers for Border Gateway Protocol (BGP) updates.

BACKGROUND OF THE DISCLOSURE

BGP is an exterior gateway protocol designed to exchange routing and reachability information among Autonomous Systems (AS) on the Internet. Autonomous Systems are each a single domain that presents a defined routing policy to the Internet, via BGP. That is, network operators use BGP to advertise reachability within their networks. BGP can be viewed as the protocol supporting the backbone of the Internet. A given BGP router may accept Network-Layer Reachability Information (NLRI) updates from multiple neighbors (peers) and advertise NLRI to the same, or a different set, of neighbors. The BGP process maintains several Routing Information Base (RIB). The RIB is also referred to a Routing Table (RT) which, and the RIB is a data table stored in a router that lists the routes to particular network destinations, and in some cases, metrics (distances) associated with those routes. The routing table contains information about the topology of the network immediately around it. There can be different variations of the RIB, all of which are contemplated herein, such as RIB: routers main routing information base table, Loc-RIB: local routing information base BGP maintains its own master routing table separate from the main routing table of the router, Adj-RIB-In: for each neighbor, the BGP process maintains a conceptual adjacent routing information base, incoming, containing the NLRI received from the neighbor, Adj-RIB-Out: for each neighbor, the BGP process maintains a conceptual adjacent routing information base, outgoing, containing the NLRI send to the neighbor, and the like.

BRIEF SUMMARY OF THE DISCLOSURE

The present disclosure relates to systems and methods for backpressure notifications to peers for Border Gateway Protocol (BGP) updates. BGP update messages to/from neighbors (peers) can be received/transmitted at given rates. To accommodate the size of the RIB and the update rates, existing techniques rely on filtering to maintain a given size of the RIB and/or terminating given BGP sessions which are problematic. However, these approaches are not always effective and there are situations where BGP sessions can overwhelm a router, leading to network outages. To that end, the present disclosure includes detection of BGP updates (i.e., notifications) at high rates along with backpressure notifications to associated peers. These techniques lead to routers that are more scalable and resilient.

In some embodiments, the present disclosure includes a method having steps, a router configured to implement Border Gateway Protocol (BGP) and the steps, a non-transitory computer-readable medium with instructions that, when executed, cause one or more processors to implement the steps. The steps include receiving BGP updates from one or more BGP peers connected to the router; detecting a trigger related to BGP updates where the trigger is indicative of a need to apply backpressure by the one or more BGP peers; and sending a backpressure notification message to the one or more BGP peers based on the trigger, such that the one or more BGP peers apply the backpressure.

The steps can further include monitoring one or more criteria associated with operation of the router, for the trigger. The one or more criteria can include any of an incoming rate of prefixes from BGP update messages, a fill rate of a Routing Information Base (RIB), memory usage, and processor usage. The steps can further include detecting the trigger related to BGP updates has cleared; and sending a second backpressure notification message to the one or more BGP peers based on the trigger, such that the one or more BGP peers remove the backpressure. The trigger can have cleared when a High Water Mark (HWM) is clear along with an optional hysteresis level. The backpressure can include the one or more BGP peers one or more of pausing and reducing the BGP updates to the router.

The steps can further include, responsive to detecting a need to remove the backpressure, causing deactivation of the backpressure. The steps can further include determining which BGP peers support the backpressure, and, responsive to the trigger, constraining the backpressure notification message to the one or more BGP peers where the one or more BGP peers support the backpressure. The backpressure notification message can be a BGP notification message having a specific error code designating backpressure, and an error sub-code to designate whether to apply backpressure and whether to remove backpressure.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for backpressure notifications to peers for Border Gateway Protocol (BGP) updates. BGP update messages to/from neighbors (peers) can be received/transmitted at given rates. To accommodate the size of the RIB and the update rates, existing techniques rely of filtering to maintain a given size of the RIB and/or terminating given BGP sessions which are problematic. However, these approaches are not always effective and there are situations where BGP sessions can overwhelm a router, leading to network outages. To that end, the present disclosure includes detection of BGP updates (i.e., note the terms updates and notifications can be used interchangeably) at high rates along with backpressure notifications to associated peers. These techniques lead to routers that are more scalable and resilient.

The present disclosure includes sending BGP update messages to peers to either lock or reduce the update rate of sending prefixes, instead of terminating the BGP neighborship and affecting the existing configured traffic paths. This can include detecting a trigger for backpressure, sending a notification to perform some remediation, detecting the trigger is gone, and sending a notification to stop the remediation. The remediation can include pausing BGP updates, reducing a rate of the BGP updates, propagating a notification to its peers regarding the same, and the like. The notification can be embedded in an existing BGP message as well as a new BGP message.

The present disclosure includes:

Early detection of backpressure based on the engineered limits of a router.

Sending a BGP notification to the BGP peer to trigger it to lock themselves (so no prefixes are sent) rather than terminating the BGP neighborship.

Automatic BGP Session lockout to prevent network fallout without taking down a peer adjacency which would cause a withdraw and further deterioration.

Determination of lockout sessions amongst a confederation of BGP peers.

Further to BGP backpressure notification, enhancements can be built to check on the BGP session automatically periodically for the state to clear or trigger any alarms for the network operator indicative of a remedial action.

Since a backpressure leads to a partially converged network, it is not ideal to leave the network in such a state. However, a locked-out session avoids a network fallout, and guarantees RIB and Forwarding Information Base (FIB) are up to date with the engineered capacity of a router. Having only a part of the network in a deteriorated state also may allow the operator to have access to the problem router for triage and restoration of services.

Problem

The problem can be summarized based on the fact routers are physical equipment having given capabilities upon deployment (memory, processor, etc.). The graph of the capabilities of routers can be viewed as stair steps, namely each router has given increases over its predecessors. The rate of growth of the Internet, defined by BGP updates, is not constrained to steps, but increases each moment. There are situations where these two graphs are problematic, namely the BGP updates are outside the capabilities of a given router, overwhelming that router, and potentially causing a network outage.

Internet outages are significant disruptions in economic terms and customer dissatisfaction. When there is a significant Internet outage, network operators tend to avoid detailed explanations and tend to blame inadvertent operator error, software upgrades, etc. However, it is possible to analyze the activity before an outage and during the outage to surmise a cause. It has been seen that spikes in BGP updates are seen before some outages, leading to the assumption that routers are crashing due to BGP updates overwhelming physical capabilities. Network operators avoid these detailed explanations and rather blame simple, fixable problems such as operator error, for obvious reasons.

Figure 1:
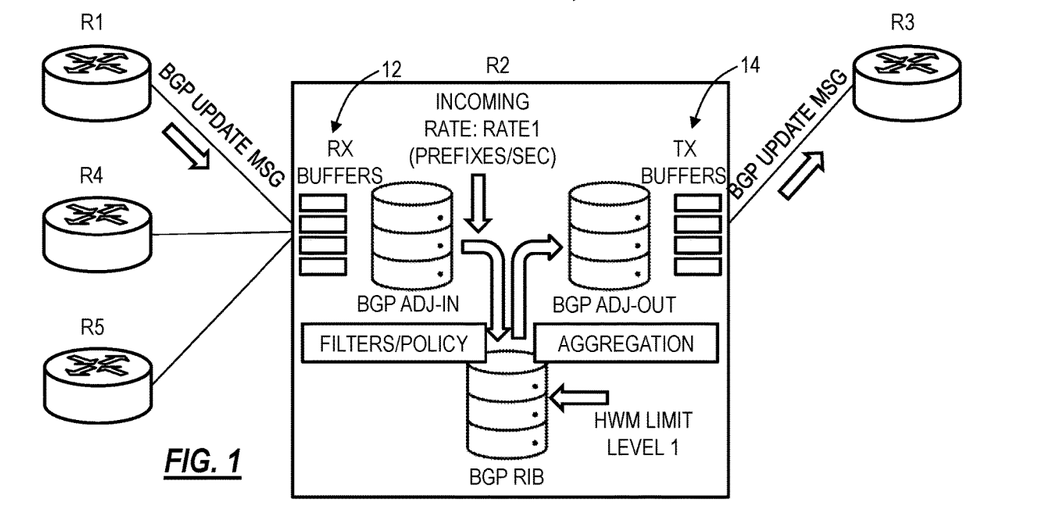
FIG. 1 is a network diagram of a network having five interconnected routers.

FIG. 1 is a network diagram of a network 10 having five interconnected routers R1, R2, R3, R4, R5. The network 10 is presented for illustration purposes and those skilled in the art will recognize different configurations, topologies, etc. are contemplated herewith. For illustration purposes, the router R2 is illustrated in detail, from a functional perspective, whereas the routers R1, R3, R4, R5 are merely shown as a single icon. Of course, all of the routers R1, R2, R3, R4, R5 include circuitry for packet switching, e.g., at layers 2, 3, etc., routing, and forwarding. The functional details of the routers R1, R2, R3, R4, R5 are omitted here in detail as one skilled in the art appreciates how a router operates.

In this example, the routers R1, R4, R5 are sending BGP update messages to the route R2 which is in turn sending BGP update messages to the router R3. Of course, this process can be bidirectional, namely each router R1, R2, R3, R4, R5 is both receiving and transmitting BGP update messages to one another. In this context, the routers R1, R3, R4, R5 can be referred to as peers or neighbors of the router R2. Also, those skilled in the art will recognize each router R1, R2, R3, R4, R5 can be in a separate AS (external BGP), the routers R1, R2, R3, R4, R5 can all be in the same AS (internal BGP), as well as any combination thereof. Stated differently, the present disclosure can be used in either iBGP, eBGP, or both. The routers R1, R2, R3, R4, R5 can be referred to as BGP routers as well.

The BGP router R2 includes receive buffers 12, communicatively coupled to ports (not shown) that are connected to its BGP peers, e.g., in this case since we are illustrating the routers R1, R4, R5 sending BGP updates, the receive buffers 12 are connected thereto. The BGP router R2 further includes transmit buffers 14 communicatively coupled to ports (not shown) that are connected to its BGP peers, e.g., in this case, to the router R3. The buffers 12, 14 are storage circuits used to buffer packets before they are sent out the ports, "on the wire," or processed internally after being received, and while the buffers 12, 14 can buffer any packet, the present disclosure addresses BGP update messages (which are packets).

BGP includes various message types, e.g., open, update, keepalive, notification, but the present disclosure addresses the BGP update messages, which require processing on the router R2, and where such processing can overwhelm the router R2. The BGP router R2 receives prefixes (addition/withdrawals) from its BGP neighbors, the routers R1, R3, R4, R5, in the BGP update messages. As is known in the art, a prefix in BGP includes an Internet Protocol (IP) version 4 (IPv4) or version 6 (IPv6) address block that is being announced along with a path of AS numbers, indicating which ASNs the traffic must pass through to reach the announced address block. The BGP router R2 processes these prefixes, installs the routes into its RIB and announces them to other BGP peers.

The BGP router R2 includes three RIBs, a BGP ADJ-IN RIB connected to the receive buffers 12 and configured to receive incoming prefixes from the BGP update messages from the routers R1, R4, R5, where the incoming prefixes are received at an incoming rate, RATE1, of X prefixes per second, or any other measurement. The router R2 includes circuitry configured to filter the incoming prefixes in the BGP ADJ-IN RIB, according to policy, before they are installed in the second RIB, namely a BGP RIB, which can be filled up to some High Water Mark (HWM). The router R2 further includes circuitry configured to aggregate the prefixes in the BGP RIB for sending out router R2's own BGP update messages, e.g., to the router R3.

We had a key observation that, in the case where the router R2 is not able to handle the large number of routes (prefixes) or BGP update messages (due to memory limitation, processor overloads, or any other scale limiting factors), the router R2 can start behaving unexpectedly or become unresponsive. That is, the inability to handle the large number of routes or BGP update messages is due to any physical equipment, software configuration, etc. in the router R2. Also, since the router R2 may now, in its poor state with unexpected behavior, flood the large volume of updates to the iBGP network, it may lead to a complete network blackout. Other problems can include session flapping with unstable links, and the like. Also, when the router tries to reconnect, there is additional processing, further exacerbating the situation.

Prefix filtering is helpful to manage the size of the RIB given physical capabilities of a router, namely memory and storage space. Of course, filtering also requires processor capability to perform the various techniques. Generally, prefix filtering does not alleviate issues when the BGP updates are at rates beyond the physical capabilities of a router. In general filters are configured to block propagation of routes beyond a certain point. These filtering mechanisms work well in current deployments but are prone to errors during re-configuration, upgrades, and policy updates. Terminating a BGP relationship is another possible approach to reducing the rates, but this causes the network routes in the terminated domain to go dark and be inaccessible.

There is no solution existing to apply backpressure to the prefix announcing peer. As described herein, the term backpressure, in networking as well as in the present disclosure, means some ability to control the rate of BGP update messages from an upstream router, e.g., the router R2 being able to control the BGP update messages being sent from any of the routers R1, R4, R5.

BGP Backpressure Notification

The present disclosure includes updates and additional functionality in BGP to support backpressure notification where a given router R1, R4, R5 can either stop sending BGP update messages for a given time or until a further notification, as well as reduce a rate of the BGP update messages, again for a given time or until a further notification. This backpressure described herein contemplates operation with existing prefix filtering approaches. In particular, we believe, even in a perfect prefix filtering scheme, there are situations where the router R2 can behave unexpectedly or become unresponsive. Also, the backpressure described herein contemplates replacing any termination of the BGP neighborship and affecting the existing configured traffic paths, thereby not affecting existing configured traffic paths.

Even further, the backpressure described herein can be used with routers that may not support this functionality, thereby preserving compatibility and backwards compatibility with BGP routers. In this case, a router R4, e.g., receiving a backpressure notification and not being configured to apply the backpressure, the router R2 can realize this is not possible with the router R4 (by noticing no change in rates) and apply more backpressure to other routers, e.g., router R1, that do support the backpressure notification. Also, assume none of its BGP router peers support this functionality, the router R2 can apply backpressure solely itself on its outgoing BGP update messages. Here, the router R2 can mitigate any unexpected behaviors on the network by limiting itself.

Example Backpressure Operation

Figure 2:
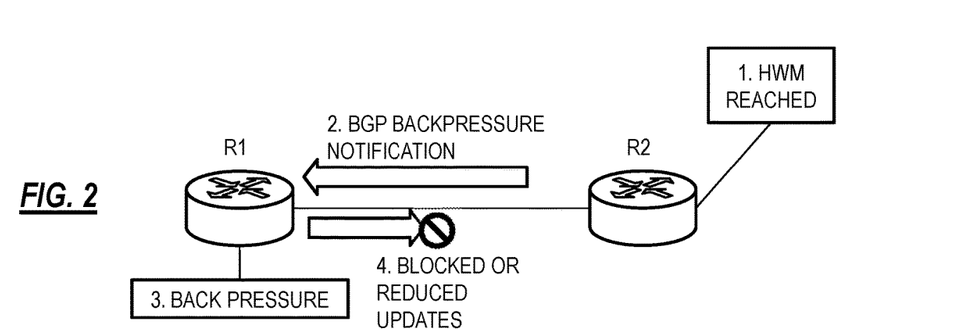
FIG. 2 is a network diagram of the network focusing on the routers R1, R2 for illustrating the application of backpressure.
Figure 3:
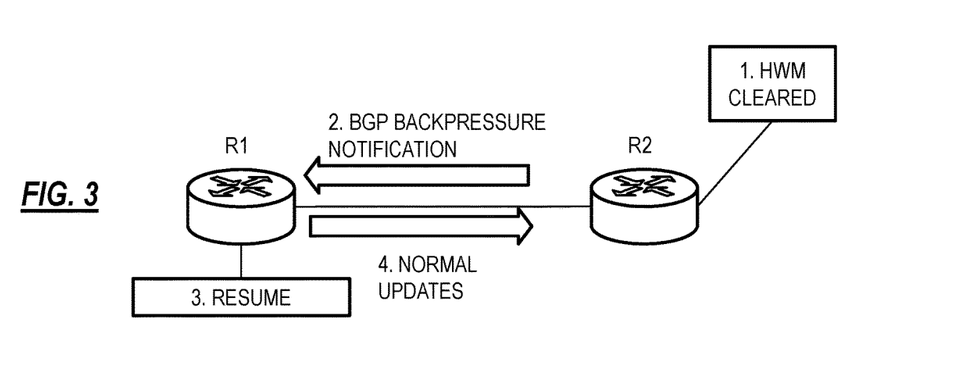
FIG. 3 is a network diagram of the network focusing on the routers R1, R2 for illustrating the removal of backpressure.

FIG. 2 is a network diagram of the network 10 focusing on the routers R1, R2 for illustrating the application of backpressure. FIG. 3 is a network diagram of the network 10 focusing on the routers R1, R2 for illustrating the removal of backpressure. In this example, the routers R1, R2 both support the backpressure notification, application, and removal. The router R2 can be configured with some limit to detect a threshold and to detect the threshold has been reached. Here, we describe this threshold as a HWM limit. In this example, the threshold can be a HWM limit of the incoming rate, RATE1, a HWM limit in the BGP RIB, a limit set at level 1 (L1), and the like. Here, the L1 and/or RATE1 threshold are physical indications that can be monitored and detected at the router R2. Those skilled in the art will recognize these are example technique to detect a high rate and others are contemplated, such as some processor thresholds related to BGP prefix processing, and the like. The key here is there is some way to locally detect at the router R2 that the processing of BGP update messages has become intense, problematic, etc. such that some poor behavior is at risk. Also, the present disclosure contemplates multiple criteria for detection. For example, the router R2 has its HWM limit L1 reached in the BGP RIB, and the prefix receive rate from a peer (say router R1) is more than the upper limit RATE1. Those skilled in the art will recognize there can be any implementation for this detection; all of which are contemplated herewith, as well as combinations thereof. That is, the RIB HWM L1 and prefix rate RATE1 can also be inferred as a function of memory and processor utilization.

Also, assume the router R2 has multiple peers, which practically will always be the case, the detection can be generalized to all peers, to a subset of peers, as well as to individual peers. Note, depending on the criteria being monitored, some apply individually to peers, such as the incoming rate RATE1, whereas other criteria apply locally to the router R2, such as the HWM limit L1 in the BGP RIB. Whether the detection is individual, e.g., router R1 is sending at a rate over the limit RATE1, or global, e.g., the BGP RIB in the router R2, determines who gets the notifications, what the notifications ask for, etc. The detection can also be applied to some or all peers differently. For example, each peer is monitored for the incoming rate RATE1, and only those peers which exceed the rate will receive the new BGP backpressure notification. Also, there can be a cumulative rate exceeding some other limit, say RATE2, that is tracked and leads to backpressure notification to the peer(s) contributing the most until the cumulative rate RATE2 drops below the configured threshold. The cumulative rate can include the rate of all incoming prefixes from all BGP peers.

Note, step 1 in each of in FIGS. 2 and 3 relates to detection of the need for backpressure, namely some HWM has been reached (FIG. 2), and the opportunity to remove the backpressure, namely the HWM has been clearer (FIG. 3), as well as some hysteresis threshold to prevent flapping. Upon detection in FIG. 2, the router R2 sends a BGP backpressure notification message to the router R1 (FIG. 2, step 2). For example, the detection in FIG. 2 can be the router R2 sending at a rate greater than RATE1 and/or the BGP RIB is filled greater than the HWM limit L1. In FIG. 2, the BGP backpressure notification message is telling the router R1 to do something, namely apply backpressure (FIG. 2, step 3). Again, the present disclosure defines backpressure as anything that reduces the transmission rate of BGP updates, e.g., delaying for a period of time, stopping for a period of time, reducing the rate for a period of time, and the like. Once the router R1 receives the backpressure notification message, it applies the backpressure to block or reduce BGP updates (FIG. 2, step 4).

The objective is to alleviate the condition at the router R2 that causes the need for the backpressure notification message. In FIG. 3, step 1, at some point, it is determined the backpressure has been successful and the causing condition (HWM) has cleared. This triggers the router R2 to send another BGP backpressure notification message to the router R1 (FIG. 3, step 2), which notifies the router R1 to remove the backpressure (i.e., resume normal operations, FIG. 3, step 3), leading the router R1 to send normal BGP updates (FIG. 3, step 4).

In this approach, we do not take down the BGP session which causes further BGP table route table announcements and updates. The set of backpressured sessions can create a linkage to the root of the problem and can be used by a network management solution for Root Cause Analysis (RCA), to remediate further problems with some upgrade or fix, e.g., memory or processor updates.

Example Notifications

The present disclosure includes a detection mechanism (described above), a backpressure application mechanism (also described above), and a notification mechanism (described herein). That is, there is a requirement for the router R2 to notify its peers to apply and remove backpressure. The present disclosure contemplates any such approach, and the following describes one example implementation, for illustrative purposes.

Figure 4:
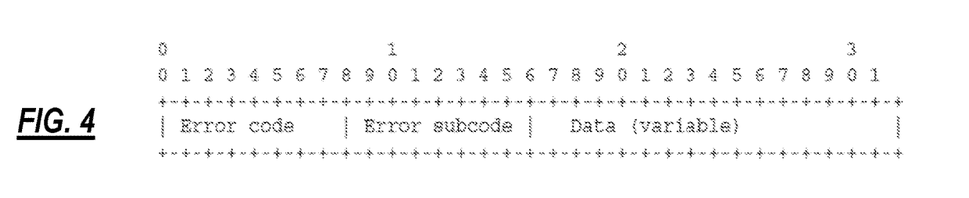
FIG. 4 is a diagram of a new BGP notification message, for backpressure notifications.

In an embodiment, the present disclosure includes a new BGP notification message, such as shown in FIG. 4. RFC 4271, "A Border Gateway Protocol 4 (BGP-4)," January 2006, the contents of which are incorporated by reference, defines the BGP notification message in Sec. 4.5, and the error handling in Sec. 6. FIG. 4 is from Sec. 4.5 in RFC 4271. In an embodiment, we propose a new error code and new error subcode related to BGP backpressure notifications. Those skilled in the art will appreciate the following is merely an example.

| | |
|---|---|
| Error code | X (system overload) |
| Error sub-code 1 | Y (apply backpressure) |
| Error sub-code 2 | Z (remove backpressure) |

When the router R1 receives the BGP notification with error code X and with error sub-code 1, it will apply backpressure to the BGP session to the router R2. After the router R2 clears the HWM condition whenever it detects normal CPU/memory/number of update messages. This can be clear via user intervention as well. Under that condition, the router R2 will send a BGP notification with error code X with error sub-code 2 and whenever router R1 receives the BGP notification with error code X with error sub-code, it will remove the backpressure.

Note, the BGP notification with the error code X is one approach. Here, the error code X can be a new error code as well as an existing error code. Of note, per RFC 4271, if a receiving router does not support the error code and the error sub-code, it brings down the BGP session. This may be undesirable. In an embodiment, there can be some indication, such as at BGP session creation, as to whether a given router supports backpressure. Again, the router R2 has flexibility for backpressure with its peers and it is undesirable to bring sessions down. Here, the router R2 would only send BGP notifications for backpressure to its peers that it knows support this feature. The router R2 can cause more backpressure with some peers, i.e., ones that support this feature, to address the fact that not every peer may support this feature. In an embodiment, this feature (capability) can be negotiated between routers.

Also, there can be some notification from the router R2 to a management system when there is a need for backpressure, e.g., an out of band notification can be sent towards a northbound interface so that user can take the appropriate action in overload situation. The appropriate action can include hardware upgrades, configuration changes, and the like.

Example Router

Figure 5:
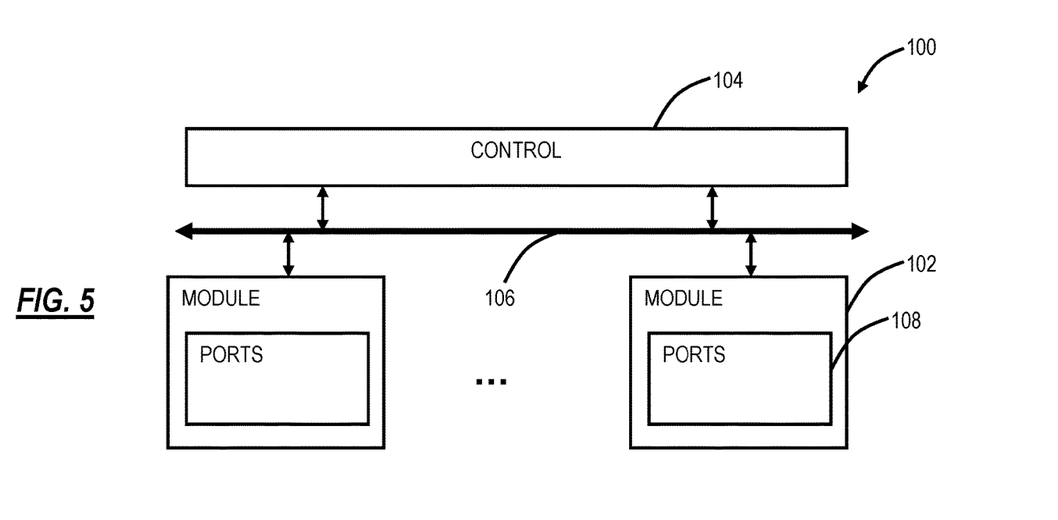
FIG. 5 is a block diagram of an example implementation of a router.

FIG. 5 is a block diagram of an example implementation of a router 100, such as the routers R1, R2, R3, R4, R5. Those of ordinary skill in the art will recognize FIG. 5 is a functional diagram in an oversimplified manner, and a practical embodiment may include additional components and suitably configured processing logic to support known or conventional operating features that are not described in detail herein.

In an embodiment, the router 100 is a packet switch, but those of ordinary skill in the art will recognize the systems and methods described herein can operate with other types of network elements and other implementations that support BGP. In this embodiment, the router 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the router 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the router 100 out by the correct port 108 to the next router 100. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the router 100. The network interface may be utilized to communicate with an element manager, a network management system, etc. Additionally, the control module 104 can include a database that tracks and maintains provisioning, configuration, operational data, and the like.

Again, those of ordinary skill in the art will recognize the router 100 can include other components which are omitted for illustration purposes, and that the systems and methods described herein are contemplated for use with a plurality of different network elements with the router 100 presented as an example type of network element. For example, in another embodiment, the router 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 5 is meant to provide a functional view, and those of ordinary skill in the art will recognize actual hardware implementations may vary.

Example Controller

Figure 6:
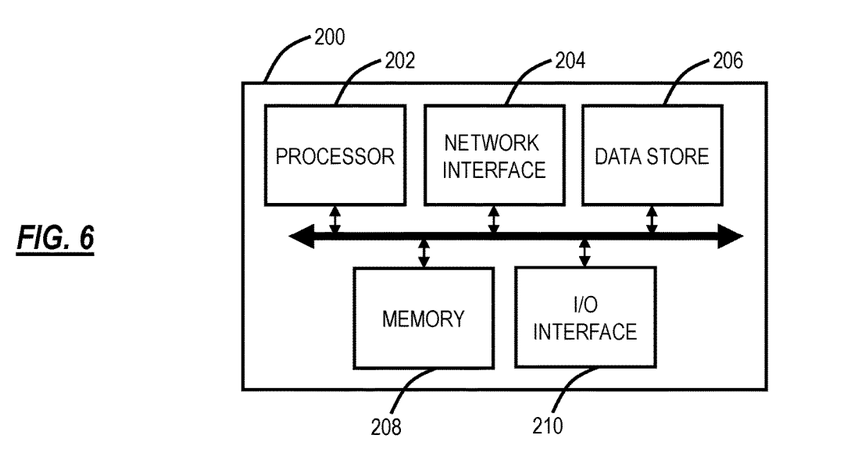
FIG. 6 is a block diagram of an example processing device.

FIG. 6 is a block diagram of an example processing device 200, which can form a control module for the router 100, etc. The processing device 200 can be part of the router 100, or a stand-alone device communicatively coupled to the router 100. Also, the processing device 200 can be referred to in implementations as a control module, a shelf controller, a shelf processor, a system controller, etc. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

BGP Backpressure Process

Figure 7:
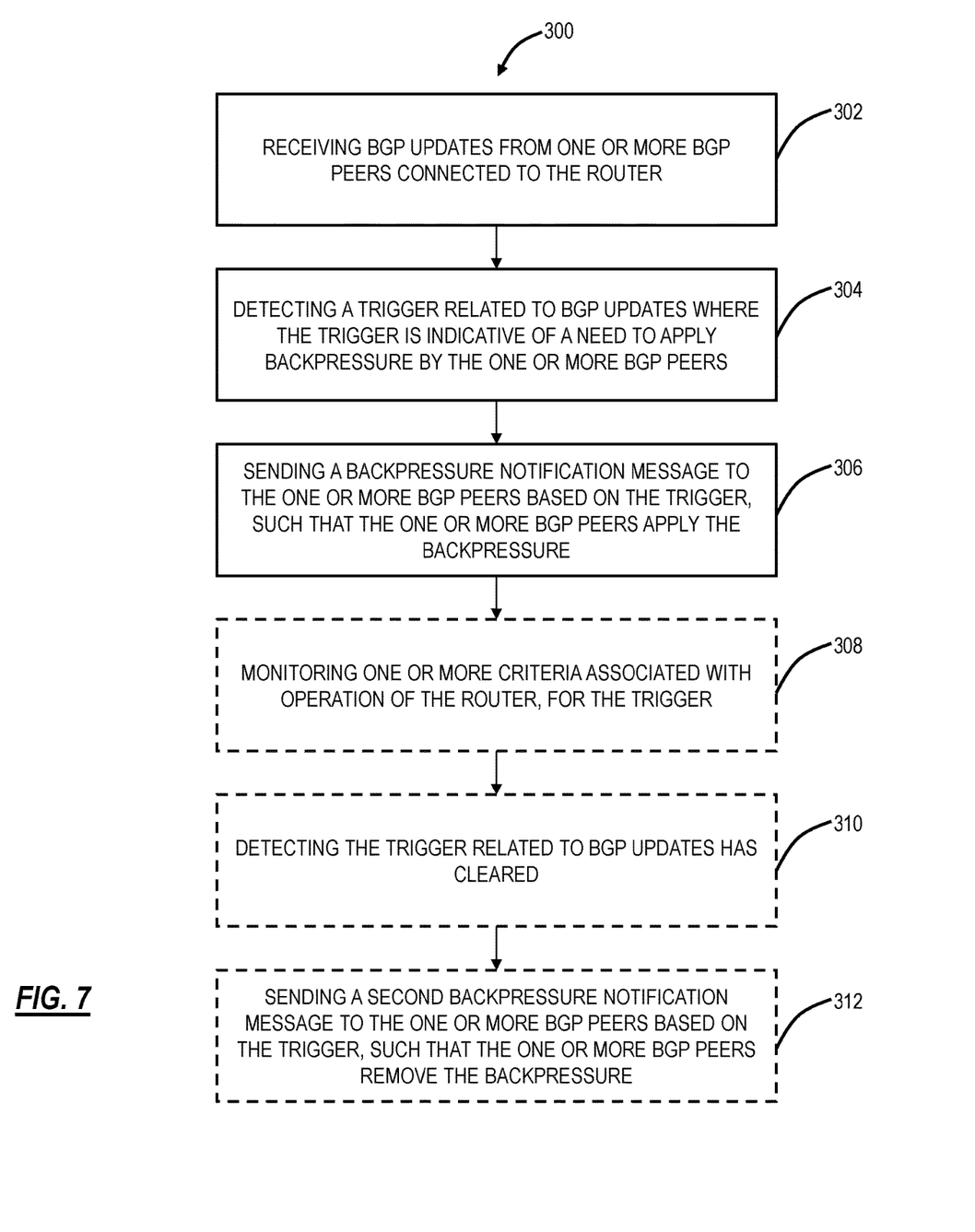
FIG. 7 is a flowchart of a process for backpressure notifications to peers for Border Gateway Protocol (BGP) updates.

FIG. 7 is a flowchart of a process 300 for backpressure notifications to peers for Border Gateway Protocol (BGP) updates. The process 300 contemplates implementation as a method having steps, via a processing device configured to execute the steps, and/or as a non-transitory computer-readable medium storing instructions that, when executed, cause one or more processors to implement the steps. For example, the process 300 is described with reference to the router R2 and its associated actions. The process 300 relates to the transmission of backpressure notification messages to cause BGP peers to apply/remove backpressure. Those skilled in the art will recognize there is also functionality implemented at the BGP peers, namely receipt of the backpressure notification messages and actions (application of or removal of backpressure).

The process 300 includes receiving BGP updates from one or more BGP peers connected to the router (step 302); detecting a trigger related to BGP updates where the trigger is indicative of a need to apply backpressure by the one or more BGP peers (step 304); and sending a backpressure notification message to the one or more BGP peers based on the trigger, such that the one or more BGP peers apply the backpressure (step 306). The process 300 further includes monitoring one or more criteria associated with operation of the router, for the trigger (step 308). The one or more criteria can include any of an incoming rate of prefixes from BGP update messages, a fill rate of a Routing Information Base (RIB), memory usage, and processor usage.

The process 300 can further include detecting the trigger related to BGP updates has cleared (step 310); and sending a second backpressure notification message to the one or more BGP peers based on the trigger, such that the one or more BGP peers remove the backpressure (step 312). The trigger can clear when a High Water Mark (HWM) is clear along with some optional hysteresis level. Of note, the removal of the backpressure can revert implicitly.

The backpressure can include the one or more BGP peers pausing the BGP updates to the router. The backpressure can include the one or more BGP peers reducing the BGP updates to the router.

The process 300 can further include determining which BGP peers support the backpressure, and responsive to the trigger, constraining the backpressure notification message to the one or more BGP peers where the one or more BGP peers support the backpressure. The determining can be based on the exchange of capability information, configuration, advertisements, etc.

The backpressure notification message can be a BGP notification message having a specific error code designating backpressure, and an error sub-code to designate whether to apply backpressure and whether to remove backpressure.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A router configured to implement Border Gateway Protocol (BGP), the router comprising circuitry configured to:
   receive BGP updates from one or more BGP peers connected to the router,
   detect a trigger related to BGP updates where the trigger is indicative of a need to apply backpressure by the one or more BGP peers, wherein the trigger is based at least on a fill rate of a Routing Information Base (RIB) based on the received BGP updates, and
   send a backpressure notification message to the one or more BGP peers based on the trigger, such that the one or more BGP peers apply the backpressure, wherein the backpressure notification message is a BGP notification message having a specific error code designating backpressure, and an error sub-code to designate whether to apply backpressure and whether to remove backpressure.

2. The router of claim 1, wherein the circuitry is further configured to monitor one or more criteria associated with operation of the router, for the trigger.

3. The router of claim 2, wherein the one or more criteria include any of an incoming rate of prefixes from BGP update messages, the fill rate of the RIB, memory usage, and processor usage.

4. The router of claim 1, wherein the circuitry is further configured to
   detect the trigger related to BGP updates has cleared, and
   send a second backpressure notification message to the one or more BGP peers based on the trigger, such that the one or more BGP peers remove the backpressure.

5. The router of claim 1, wherein the RIB is a data table in the router storing network destinations based on the BGP updates, and wherein the trigger is utilized to ensure the BGP updates do not overwhelm the RIB.

6. The router of claim 1, wherein the backpressure includes the one or more BGP peers one or more of pausing and reducing the BGP updates to the router.

7. The router of claim 1, wherein the circuitry is further configured to
   responsive to detecting a need to remove the backpressure, cause deactivation of the backpressure.

8. The router of claim 1, wherein the circuitry is further configured to
   determine which of the one or more BGP peers support the backpressure, and
   responsive to the trigger, constrain the backpressure notification message to the one or more BGP peers where the one or more BGP peers support the backpressure.

9. A method implemented in a router configured to implement Border Gateway Protocol (BGP), the method comprising steps of:
   receiving BGP updates from one or more BGP peers connected to the router;
   detecting a trigger related to BGP updates where the trigger is indicative of a need to apply backpressure by the one or more BGP peers, wherein the trigger is based at least on a fill rate of a Routing Information Base (RIB) based on the received BGP updates; and
   sending a backpressure notification message to the one or more BGP peers based on the trigger, such that the one or more BGP peers apply the backpressure, wherein the backpressure notification message is a BGP notification message having a specific error code designating backpressure, and an error sub-code to designate whether to apply backpressure and whether to remove backpressure.

10. The method of claim 9, wherein the steps further include
    monitoring one or more criteria associated with operation of the router, for the trigger.

11. The method of claim 10, wherein the one or more criteria include any of an incoming rate of prefixes from BGP update messages, the fill rate of the RIB, memory usage, and processor usage.

12. The method of claim 9, wherein the steps further include
    detecting the trigger related to BGP updates has cleared; and
    sending a second backpressure notification message to the one or more BGP peers based on the trigger, such that the one or more BGP peers remove the backpressure.

13. The method of claim 9, wherein the RIB is a data table in the router storing network destinations based on the BGP updates, and wherein the trigger is utilized to ensure the BGP updates do not overwhelm the RIB.

14. The method of claim 9, wherein the backpressure includes the one or more BGP peers one or more of pausing and reducing the BGP updates to the router.

15. The method of claim 9, wherein the steps further include
    responsive to detecting a need to remove the backpressure, causing deactivation of the backpressure.

16. The method of claim 9, wherein the steps further include
    determining which of the one or more BGP peers support the backpressure, and responsive to the trigger, constraining the backpressure notification message to the one or more BGP peers where the one or more BGP peers support the backpressure.

17. A non-transitory computer-readable medium comprising instructions that, when executed by one or more processors in a router configured to implement Border Gateway Protocol (BGP), cause the one or more processors to perform steps of:
- receiving BGP updates from one or more BGP peers connected to the router;
- detecting a trigger related to BGP updates where the trigger is indicative of a need to apply backpressure by the one or more BGP peers, wherein the trigger is based at least on a fill rate of a Routing Information Base (RIB) based on the received BGP updates; and
- sending a backpressure notification message to the one or more BGP peers based on the trigger, such that the one or more BGP peers apply the backpressure, wherein the backpressure notification message is a BGP notification message having a specific error code designating backpressure, and an error sub-code to designate whether to apply backpressure and whether to remove backpressure.

18. The non-transitory computer-readable medium of claim 17, wherein the steps further include
- monitoring one or more criteria associated with operation of the router, for the trigger.

* * * * *